United States Patent
White et al.

(10) Patent No.: US 12,289,132 B2
(45) Date of Patent: Apr. 29, 2025

(54) TIME SYNCHRONIZATION METHOD WITH TRUSTED BEACONS AND DISTRIBUTED FIBER SENSING

(71) Applicant: NEC Laboratories America, Inc., Princeton, NJ (US)

(72) Inventors: Christopher White, Neshanic Station, NJ (US); Jian Fang, Princeton, NJ (US); Sarper Ozharar, Pennington, NJ (US); Ting Wang, West Windsor, NJ (US)

(73) Assignee: NEC Corporation, Tokyo (JP)

(*) Notice: Subject to any disclaimer, the term of this patent is extended or adjusted under 35 U.S.C. 154(b) by 191 days.

(21) Appl. No.: 18/319,457

(22) Filed: May 17, 2023

(65) Prior Publication Data

US 2023/0412266 A1 Dec. 21, 2023

Related U.S. Application Data

(60) Provisional application No. 63/343,606, filed on May 19, 2022.

(51) Int. Cl.
*H04B 10/071* (2013.01)
*H04B 10/2575* (2013.01)
*H04B 11/00* (2006.01)

(52) U.S. Cl.
CPC ..... *H04B 10/071* (2013.01); *H04B 10/25756* (2013.01); *H04B 11/00* (2013.01)

(58) Field of Classification Search
None
See application file for complete search history.

(56) References Cited

U.S. PATENT DOCUMENTS

| 2020/0313763 A1* | 10/2020 | Wang | H04B 10/25753 |
| 2021/0263081 A1* | 8/2021 | Orr | G01J 3/1895 |
| 2021/0311186 A1* | 10/2021 | Huang | G01V 1/181 |
| 2021/0360029 A1* | 11/2021 | Huang | H04B 10/85 |

* cited by examiner

*Primary Examiner* — David W Lambert
(74) *Attorney, Agent, or Firm* — Joseph Kolodka (57) ABSTRACT

A method for time synchronization using distributed fiber optic sensing (DFOS) that employs several trusted time beacons that are attached to the DFOS sensing fiber which in turn is connected to the DFOS interrogator. The beacons transmit their signal via two different mediums, (1) wirelessly to sensor nodes in the coverage area, and (2) through vibrations on fiber to the DFOS/DAS system located at a trusted area such as the central office. Wireless broadcast to nearby sensors includes a timestamp and beacon ID. All the sensors in the field use one of the beacons in their vicinity (the one with the strongest signal) as their time reference and send the data back with the corresponding beacon index.

6 Claims, 8 Drawing Sheets

TIME SYNCHRONIZATION METHOD WITH TRUSTED BEACONS AND DISTRIBUTED FIBER SENSING

CROSS-REFERENCE TO RELATED APPLICATIONS

This application claims the benefit of U.S. Provisional Patent Application Ser. No. 63/343,606 filed May 19, 2022, the entire contents of which is incorporated by reference as if set forth at length herein.

FIELD OF THE INVENTION

This application relates generally to network time synchronization and distributed fiber optic sensing (DFOS) systems, methods, and structures and related technologies. More particularly, it pertains to a time synchronization method with trusted beacons and distributed fiber optic sensing.

BACKGROUND OF THE INVENTION

Time synchronization is a critically important consideration for emerging sensing network applications that require precise mapping and understanding of temporal order of events. For instance, wireless sensing networks require precise temporal synchronization of sensor nodes to determine ordering of messages, control joint activities, and serialize concurrent access to shared objects.

With the development of modern wireless sensor networks and the Internet of Things (IoT) technology, deployed sensor node numbers are growing rapidly, especially in large-scale applications such as smart cities and smart factories. As such, an emerging high-density of such nodes makes time synchronization even more critical—and challenging.

Traditional synchronization methods, such as network time protocol (NTP) and global positioning (GPS) systems are generally not suitable for such emerging sensor networks for a variety of reasons. NTP requires a sender and receiver to exchange messages multiple times, which is inefficient for sensor nodes due to their energy consumption constraints and computation capability. GPS devices are oftentimes too expensive to be installed on each sensor node, and GPS signals may be obstructed or unavailable inside a building or in an urban canyon.

To overcome these issues, several synchronization methods designed for wireless sensor networks have been proposed, including reference broadcast synchronization (RBS), time-sync protocol for sensor networks (TPSN), and flooding time synchronization protocol (FTSP). These methods broadcast the synchronization messages from a trusted beacon to a group of sensors within transmission range or a network layer. All the sensors can be synchronized "locally" to the time of the beacon within the broadcasting range. However, due to the power constraints, the communication range between beacon and sensors is strictly limited. Thus, each time beacon can only cover a limited area. For large-scale applications, multiple beacons need to be deployed to service an entire coverage area. As a result, time/clock synchronization between the multiple beacons under various environmental conditions is necessary.

SUMMARY OF THE INVENTION

An advance in the art is made according to aspects of the present disclosure directed to a novel method that accurately synchronizes all sensor nodes over a large-scale coverage area, by utilizing a new type of time beacon incorporated into distributed fiber sensing (DFOS) technologies.

In sharp contrast to the prior art and viewed from a first aspect, our inventive approach employs several trusted time beacons that are attached to the DFOS sensing fiber which in turn is connected to the DFOS interrogator. The beacons transmit their signal via two different mediums, (1) wirelessly to sensor nodes in the coverage area, and (2) through vibrations on fiber to the DFOS/DAS system located at a trusted area such as the central office. Wireless broadcast to nearby sensors includes a timestamp and beacon ID. All the sensors in the field use one of the beacons in their vicinity (the one with the strongest signal) as their time reference and send the data back with the corresponding beacon index.

The beacons send their timestamps (or clock) by generating vibrations at the fiber through their built-in vibrators or speakers. The fiber sensing interrogator detects the timestamp signal from the beacons including their unique locations which serve as their unique beacon ID (BID).

Since each beacon is located at locations that are known, fixed and unique along the fiber, the DFOS/DAS system automatically distinguishes the timestamps of each individual beacon without an additional beacon ID transmission.

Advantageously, data streams from different sensors can be synchronized centrally, by adjusting the timestamps. Of further advantage, our inventive methodology can be used for a wireless sensor network with fiber cable as the backbone, or a hybrid fiber-wireless sensor network.

As those skilled in the art will understand and appreciate, particularly distinctive features of the present disclosure include at least: 1) beacons, that broadcast their synchronization messages wirelessly to nearby sensor nodes and encode the messages acoustically to nearby optical fiber sensor cable; 2) a distributed fiber sensing system that detects synchronization messages from the beacons located at multiple locations; 3) our innovative techniques of decoding timestamps received from fiber optic sensing signals and synchronizing the sensors; and 4) since the detection of the beacons' acoustic/vibration signal by the DFOS/DAS system is spatio-temporal, (i.e. the locations of the beacons are also detected), the locations of each beacon are indicated by their unique ID, so as compared to wireless solutions, the beacons need not transmit an additional unique ID to a central office.

DETAILED DESCRIPTION OF THE INVENTION

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1A:
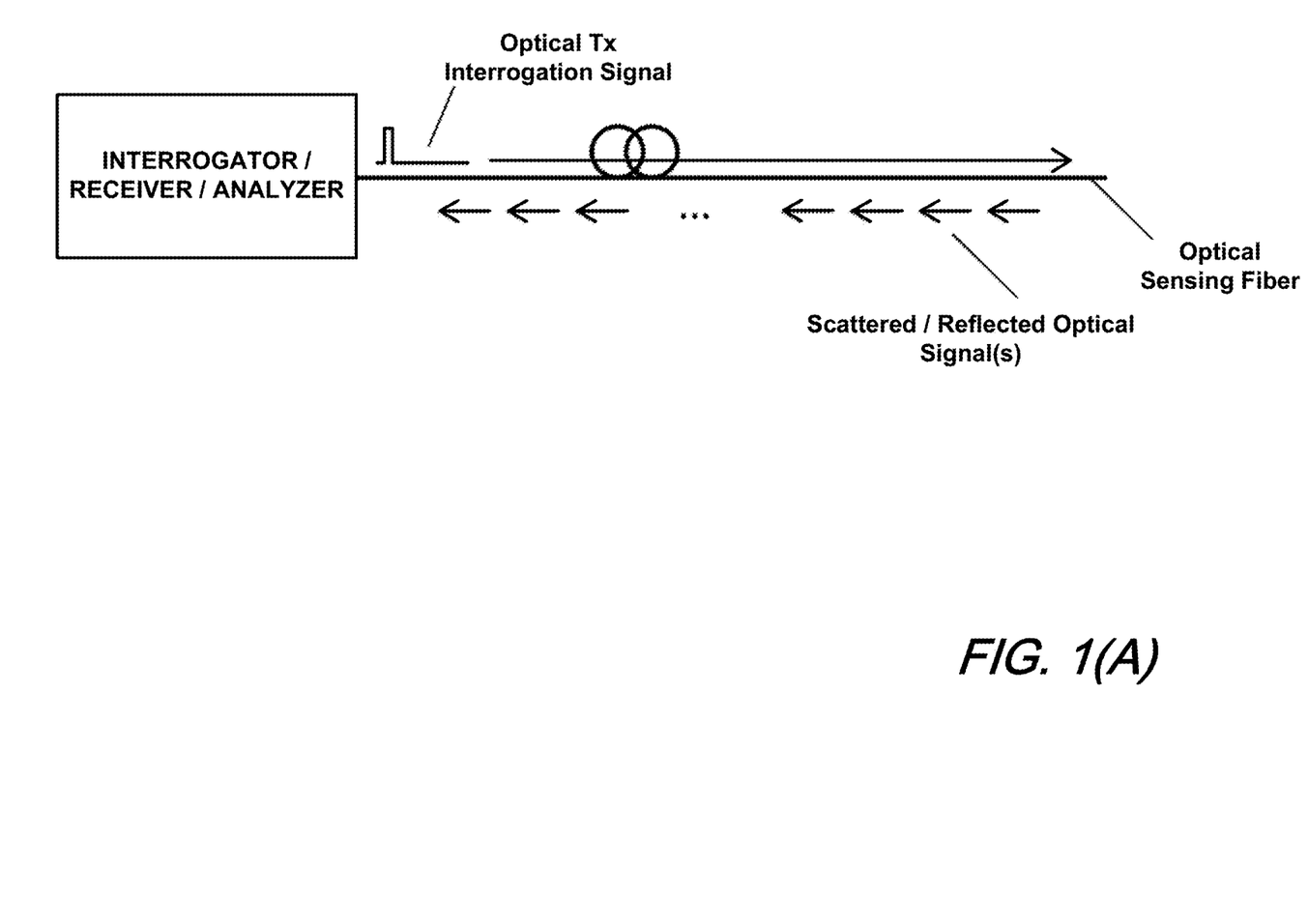
FIG. 1(A) and FIG. 1(B) are schematic diagrams showing an illustrative prior art uncoded and coded DFOS systems.
Figure 1B:
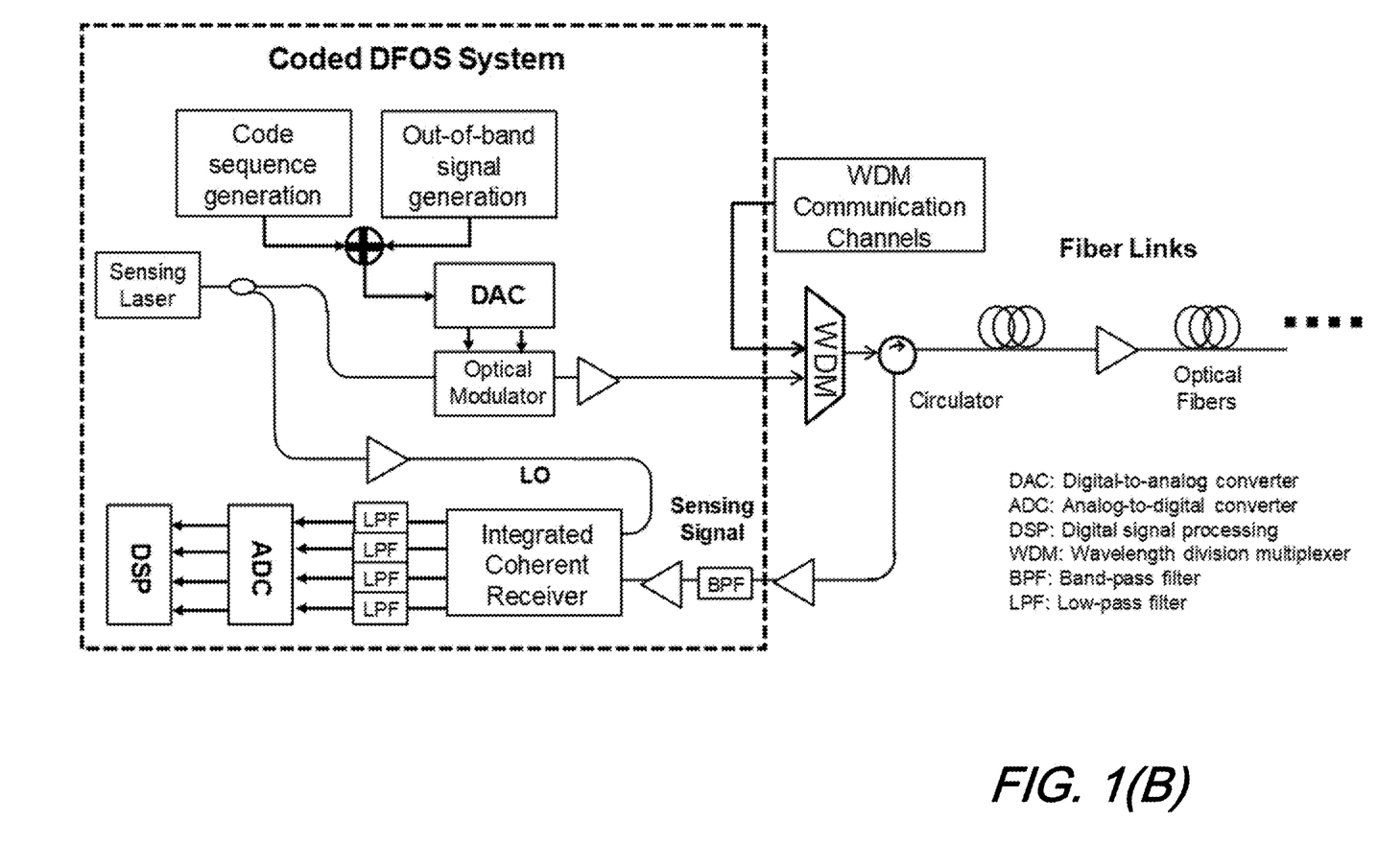

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
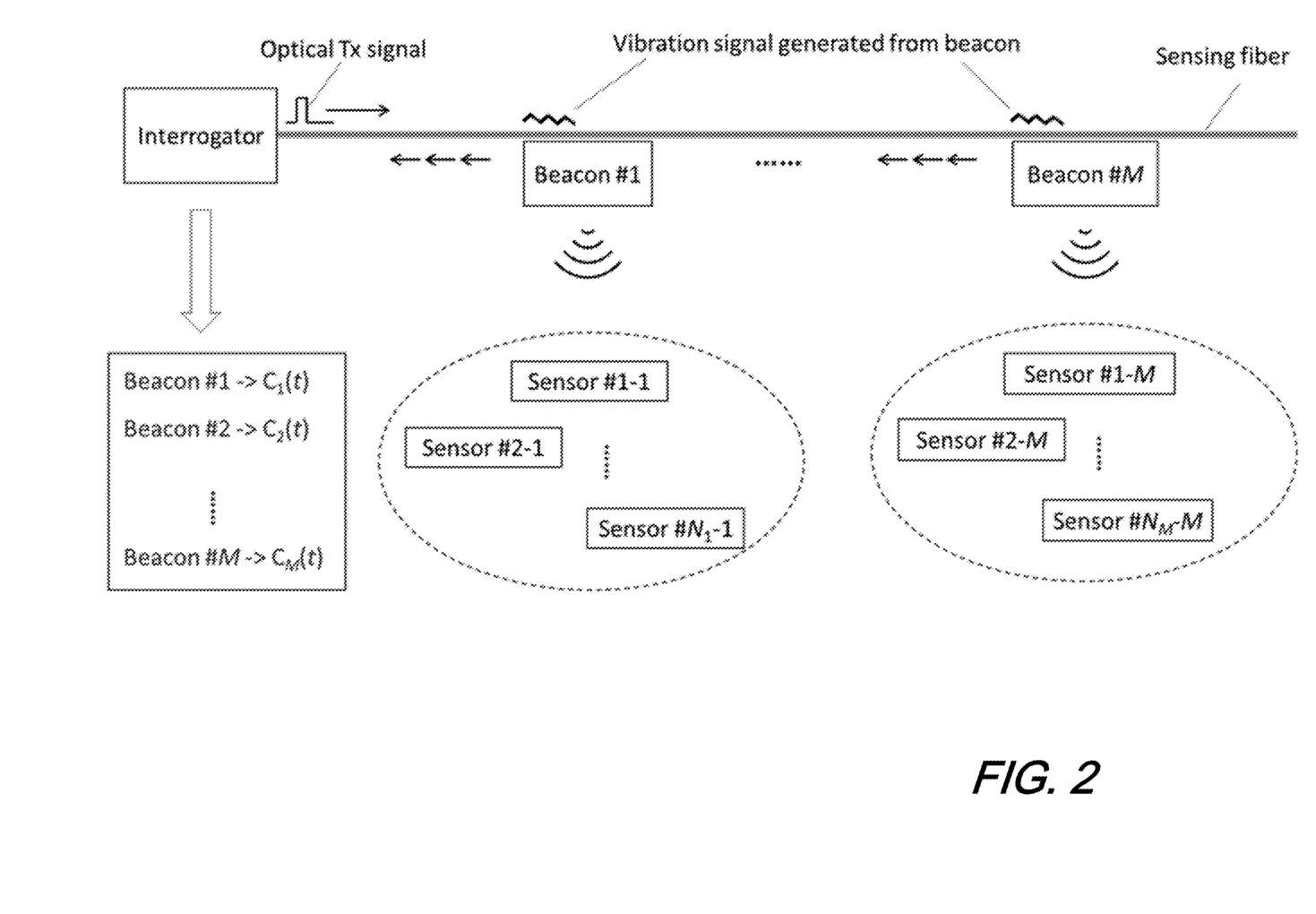
FIG. 2. Is a schematic diagram showing an illustrative network including multiple beacons and a distributed fiber optic sensing system (DFOS) according to aspects of the present disclosure.

FIG. 2. Is a schematic diagram showing an illustrative network including multiple beacons and a distributed fiber optic sensing system (DFOS) according to aspects of the present disclosure. As noted, we disclose herein a method to accurately synchronize all sensor nodes over a large-scale coverage, by utilizing a new time beacon in conjunction with distributed fiber sensing technology.

As illustratively shown in FIG. 2, several trusted time beacons (a total of M beacons in this illustrative example) are attached to the sensing fiber which in turn is connected to the DFOS interrogator—in this example a distributed acoustic sensing (DAS) system. The beacons transmit their signal via two different mediums, (1) wirelessly to sensor nodes in the coverage area, and (2) through vibrations on fiber to the DFOS/DAS system located at a trusted area such as the central office.

Wireless broadcast to nearby sensors includes a timestamp and beacon ID. All the sensors in the field use one of the beacons in their vicinity (the one with the strongest signal) as their time reference and send the data back with the corresponding beacon index.

Also, the beacons send their timestamps (or clock) by generating vibrations at the fiber through their built-in vibrators or speakers. The fiber sensing interrogator detects the timestamp signal from the beacons including their unique locations which serve as their unique beacon ID (BID).

Since each beacon is located at locations that are known, fixed and unique along the fiber, the DFOS/DAS system automatically distinguishes the timestamps of each individual beacon without an additional beacon ID transmission.

Advantageously, data streams from different sensors can be synchronized centrally, by adjusting the timestamps. Of further advantage, our inventive methodology can be used for a wireless sensor network with fiber cable as the backbone, or a hybrid fiber-wireless sensor network.

As those skilled in the art will understand and appreciate, particularly distinctive features of the present disclosure include at least: 1) beacons, that broadcast their synchronization messages wirelessly to nearby sensor nodes and encode the messages acoustically to nearby optical fiber sensor cable; 2) a distributed fiber sensing system that detects synchronization messages from the beacons located at multiple locations; 3) our innovative techniques of decoding timestamps received from fiber optic sensing signals and synchronizing the sensors; and 4) since the detection of the beacons' acoustic/vibration signal by the DFOS/DAS system is spatio-temporal, (i.e. the locations of the beacons are also detected), the locations of each beacon are indicated by their unique ID, so as compared to wireless solutions, the beacons need not transmit an additional unique ID to a central office.

As illustrated in FIG. 2, the overall system includes of a fiber sensing interrogator, sensing fiber (or cable), trusted time beacons, and sensor nodes. The fiber sensing interrogator (known as "the interrogator") is commonly referred to as a distributed fiber optic sensing system based on the scattering effect in optical fiber. As previously noted, the interrogator can retrieve the change of physical parameters (such as phase, intensity, spectral property, etc.) due to external perturbations like the vibration or acoustic waves.

Components of the interrogator include a laser source, modulator, amplifier, fiber-optic circulator device, receiver, and acquisition device. The light from the laser source is shaped as optical pulses by the modulator. An amplifier (e.g., an erbium-doped fiber amplifier or semiconductor optical amplifier) is optional for adjusting the optical pulse power to the desired level. A fiber-optic circulator device (e.g., circulator or coupler) transmits the optical pulses into the sensing fiber and collects the backscattering signal from the fiber. An optical receiver (with direct detection, coherent detection, or a phase demodulator configuration) detects the returned optical signal and converts it into electrical signals. Another amplifier and optical filter are optional to be placed before the receiver to increase the signal-to-noise ratio (SNR) of the backscattering signal. An acquisition device (e.g., an analog-to-digital converter) digitizes the electrical signals from the receiver and transfers them to a processor/computer for further processing.

The trusted time beacon (known as "the beacon" below) in this invention is referred to as a trusted device that has an internal clock, wireless module, vibration module, processing board, and other optional sensors. The internal clock is used to generate the timestamps in a pre-defined time format. Each trusted time beacon has a unique beacon ID (known as "BID" below) which is mapped to their unique location along the sensing fiber cable.

Figure 3:
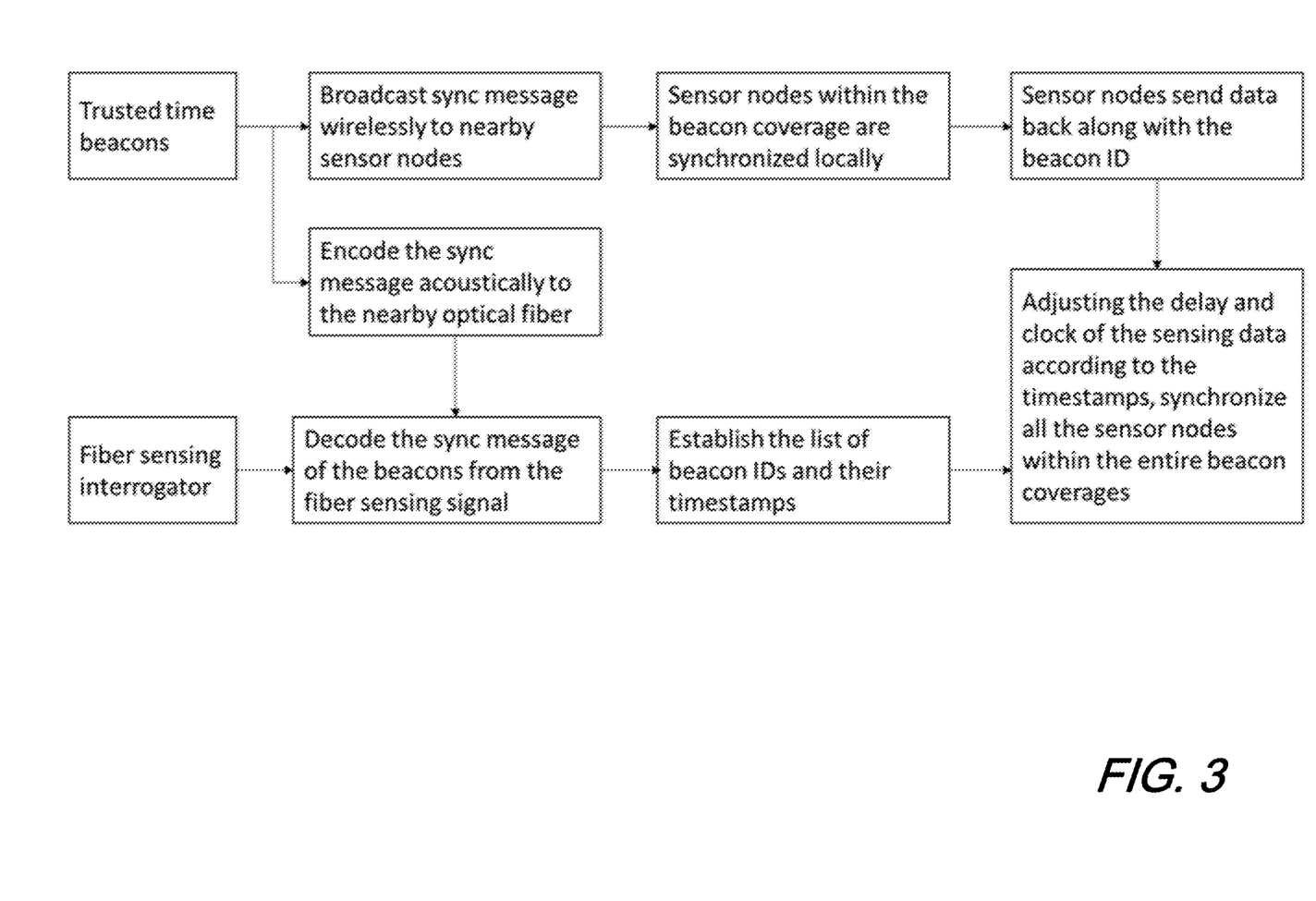
FIG. 3 is a schematic flow diagram showing illustrative operations according to aspects of the present disclosure.

FIG. 3 is a schematic flow diagram showing illustrative operations according to aspects of the present disclosure.

Figure 4:
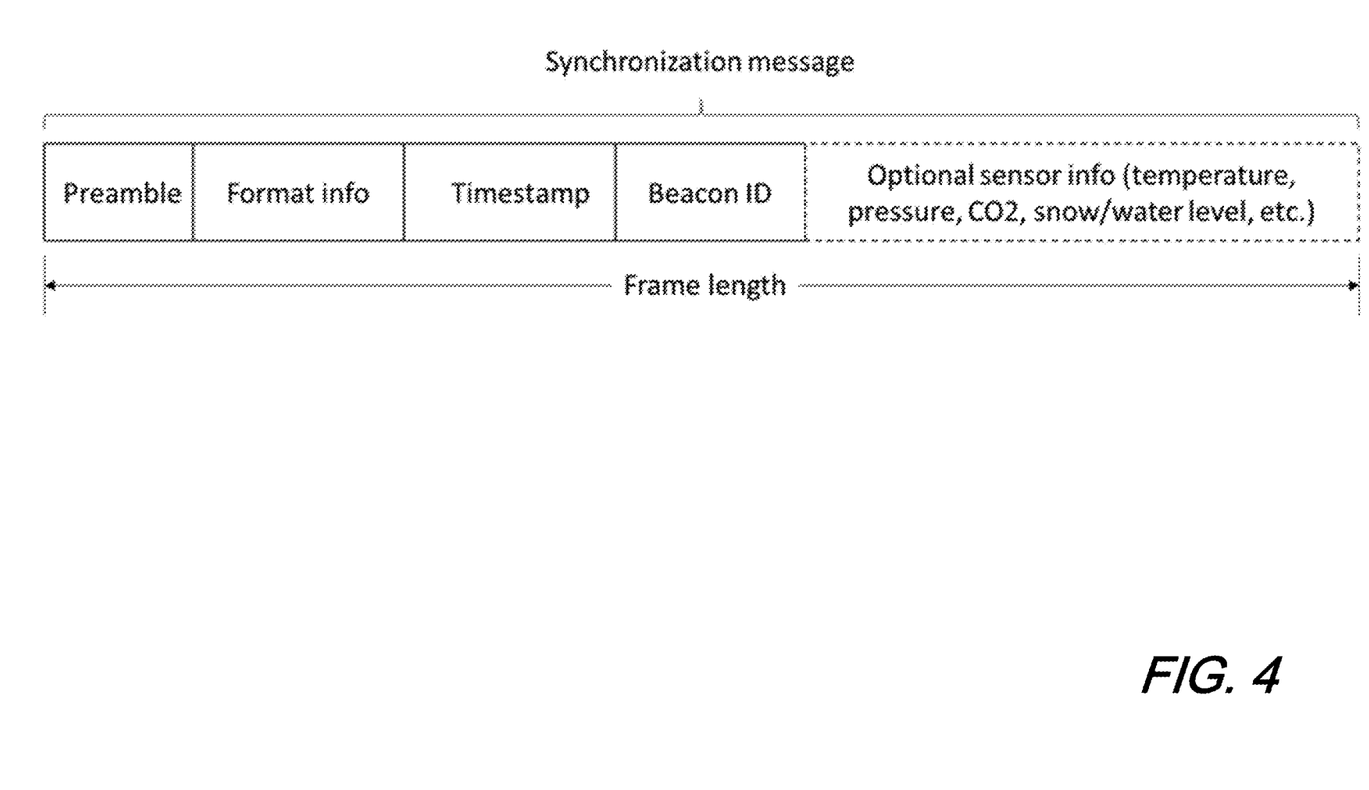
FIG. 4 is a schematic diagram showing an illustrative structure of a wireless synchronization message broadcast from beacons which does not require an explicit beacon Identifier (ID) according to aspects of the present disclosure.

FIG. 4., which is a schematic diagram showing an illustrative structure of a wireless synchronization message broadcast from beacons which does not require an explicit beacon Identifier (ID) according to aspects of the present disclosure. As shown in that figure, it illustrates a structure of a synchronization message, including preamble, format information, timestamp, BID, and optional sensor information (e.g., temperature, pressure, $CO_2$, humidity, snow/water level, geographic information, etc.)—as necessary.

Figure 5:
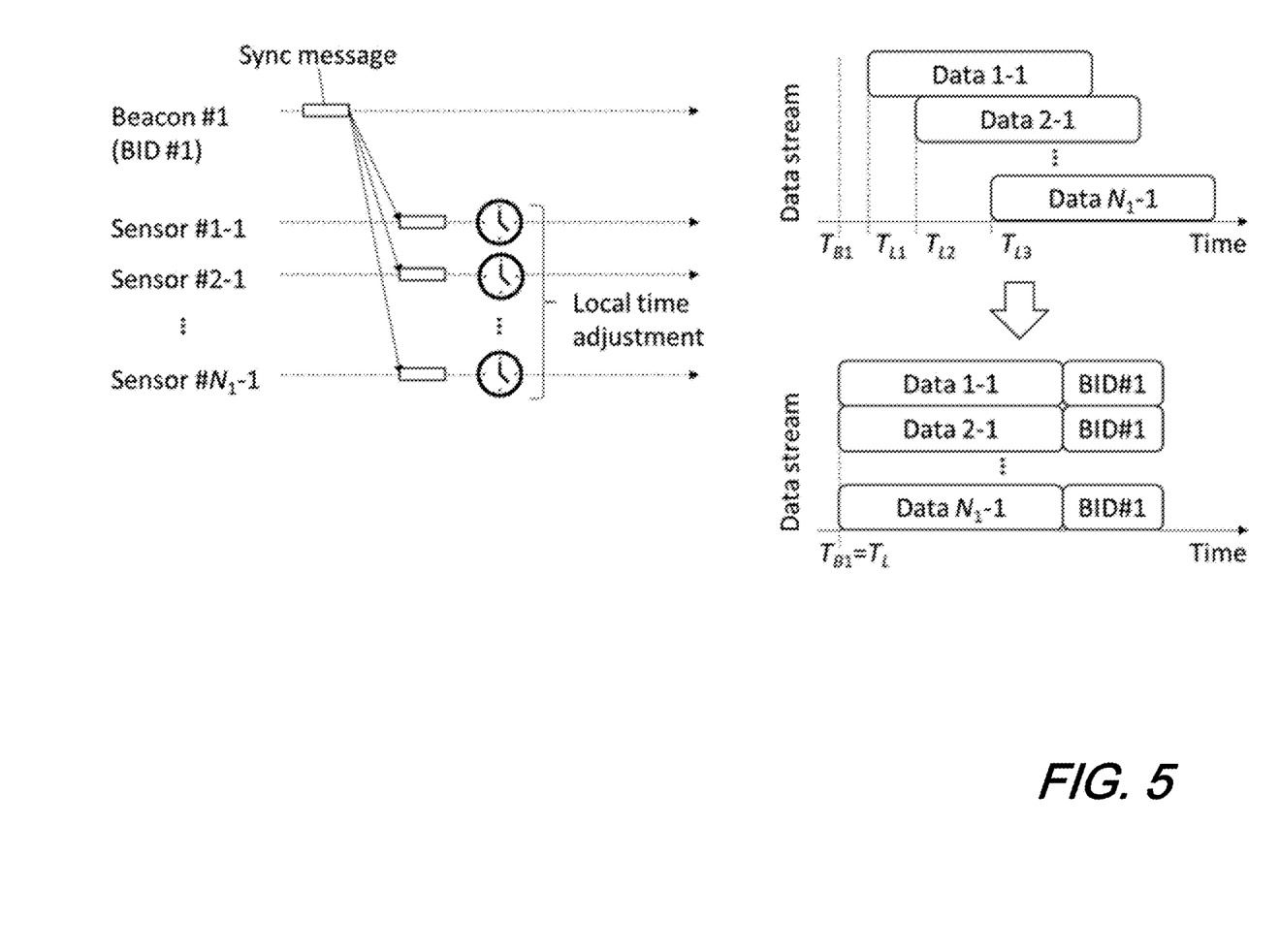
FIG. 5 is a schematic diagram showing illustrative local synchronization model according to aspects of the present disclosure.

A wireless circuit in the beacon broadcasts such synchronization messages to all nearby sensors within its communication range. For instance, in FIG. 5—which is a schematic diagram showing an illustrative local synchronization model of a wireless synchronization message broadcast from beacons which does not require an explicit beacon Identifier (ID) according to aspects of the present disclosure. Note that when transmitting the data, the sensor node will include the BID used for synchronization, sensor nodes (#1-1, #2-1, . . . , #$N_1$-1) within the coverage of beacon #1 receive the synchronization message from beacon #1. The sensor nodes then decode the synchronization message to obtain the timestamp, BID, and other information. The timestamp is used for adjusting the local time of the sensor nodes, achieving a local synchronization timescale as illustrated in A built-in vibrator located in each beacon generate a vibration signal (or acoustic signal) mechanically. In our scheme, the beacon is installed near an existing optical fiber sensor cable so that the vibration from the beacon can be picked up by the sensing fiber. Alternatively, dedicated, sensing, optical fiber or cable may also be installed near the beacons. Detailed installation schemes depend on the applications.

Figure 6:
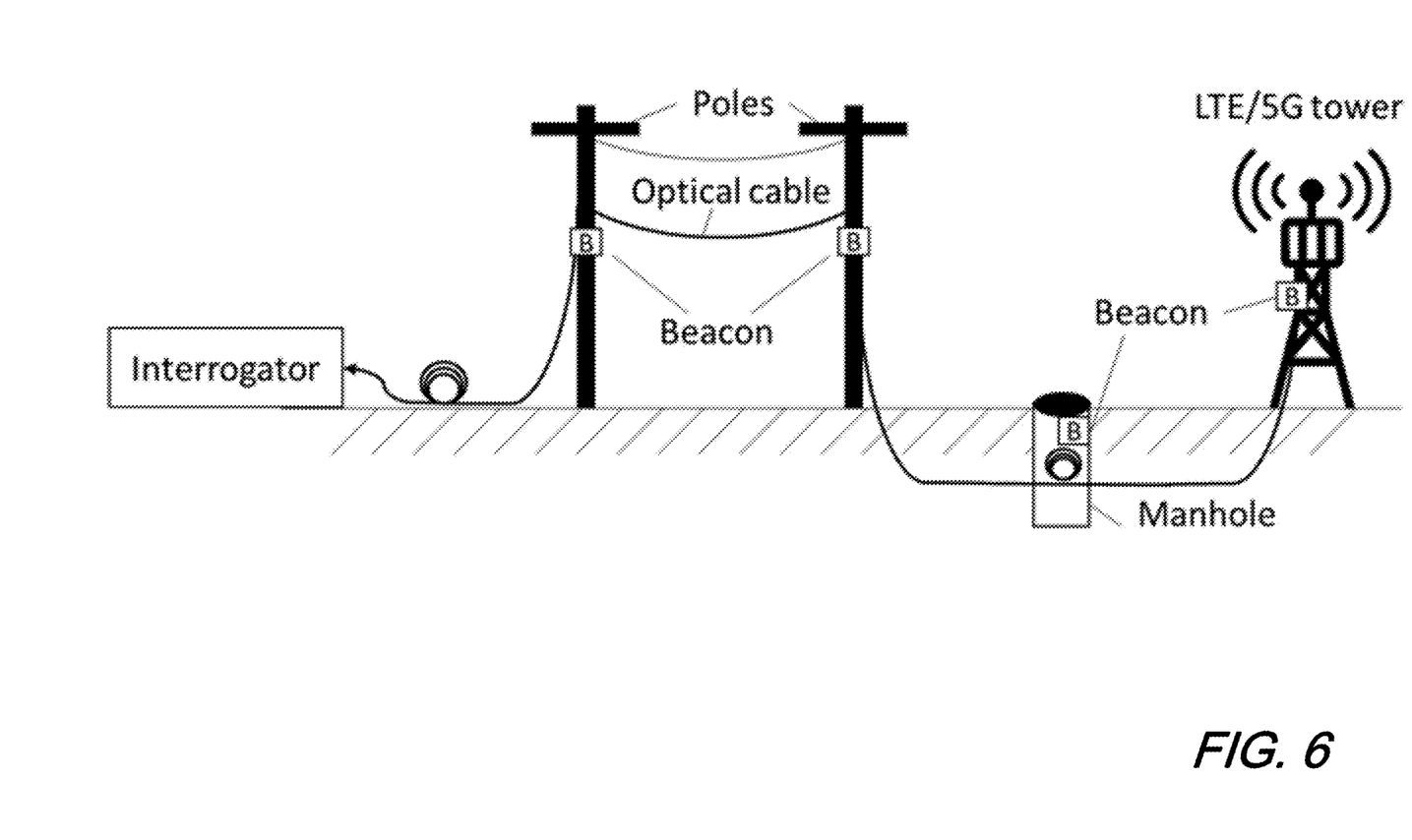
FIG. 6 is a schematic diagram showing illustrative installation scheme in application according to aspects of the present disclosure.

Note that the beacons do not need to be attached to the fiber directly, although an installation location closer to a fiber optic sensor will generally improve the signal-to-noise ratio. In real applications, the beacon may be installed on utility poles suspending aerial fiber optical cable installed, or in a manhole with buried fiber optical cable, or an LTE/5G tower with a fiber optic connection, as shown illustratively in FIG. 6., which is a schematic diagram showing illustrative installation scheme in application according to aspects of the present disclosure.

The vibration module encodes the synchronization message as an encoded vibration pattern and transmits it to the nearby fiber through a pre-defined modulation format, such as frequency modulation (FM). Note that the message sent by the vibration module may vary from the message sent by the wireless module. Since the location of each beacon on the sensing fiber is known, fixed and unique, the BID information in the vibration message is not necessary. The interrogator detects the vibration signals from all the beacons and records the synchronization messages sent from each beacon. The interrogator decodes the timestamps, BID (from location), and optional sensor information from the message, then stores them as a timestamp list. The optional sensor information may be used to compensate for the environmental influence on the synchronization data, as well as the sensing data from all the sensor nodes.

Figure 7:
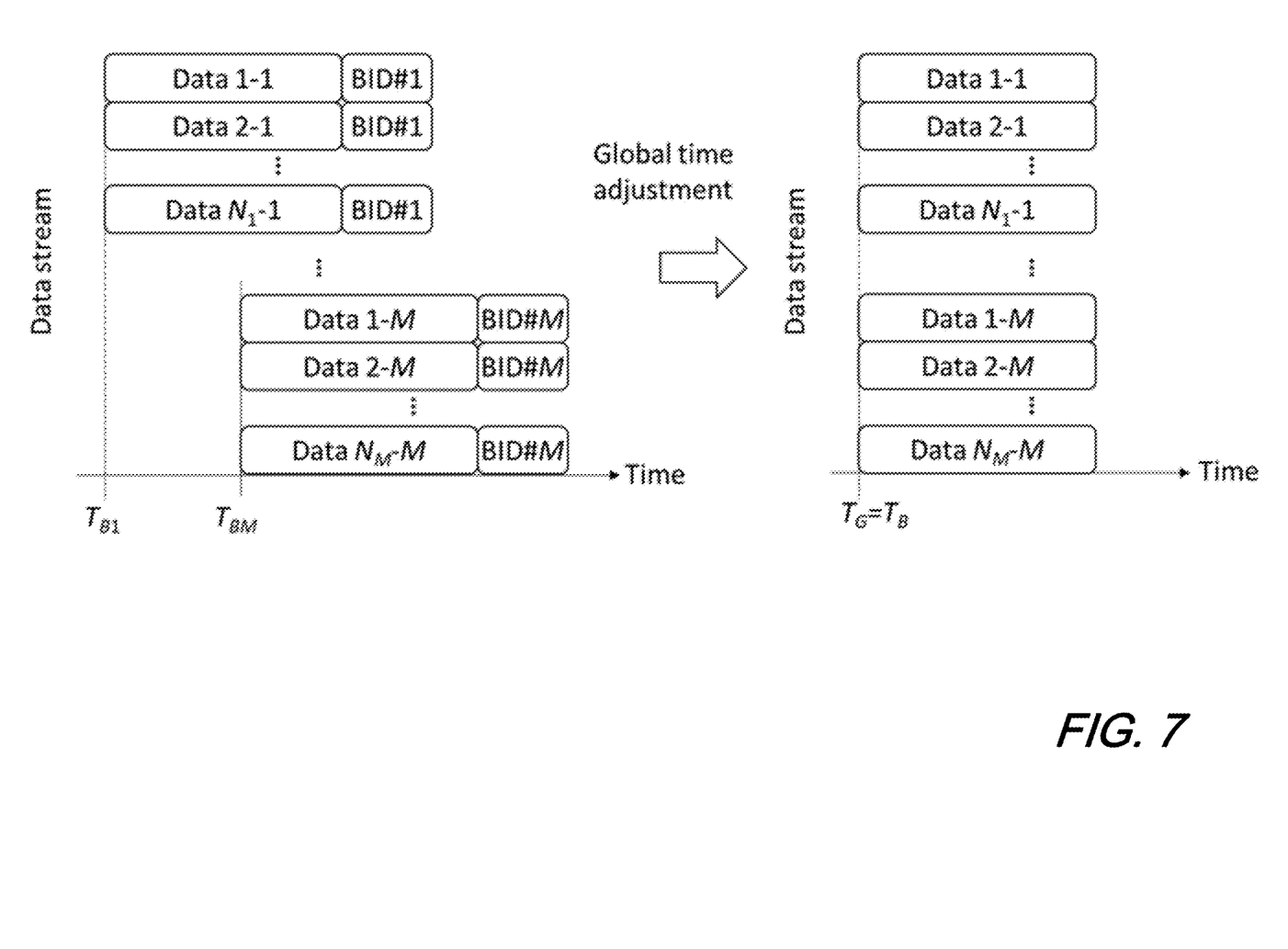
FIG. 7 is a schematic diagram showing illustrative global synchronization model according to aspects of the present disclosure.

The timestamp list from the interrogator is shared with the processing unit which processes the sensor node data. As illustrated in FIG. 4, the locally synchronized sensor data already includes the corresponding BIDs. Then the corresponding timestamps could for each group of data be determined through the timestamp list. By adjusting the differences between the timestamps, the multiple groups of locally synchronized sensor data can be globally synchronized, as shown in FIG. 7., which is a schematic diagram showing illustrative global synchronization model according to aspects of the present disclosure. Once all the data have been synchronized, the BID information is no longer required and can be removed to reduce the data size.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for distributed fiber optic sensing (DFOS) systems comprising:
providing a DFOS system including
  a length of optical sensor fiber;
  an optical interrogator configured to generate optical pulses, introduce the generated optical pulses into the optical sensor fiber, and receive backscattered optical signals in response to the introduced optical pulses; and
  an analyzer that analyzes the backscattered optical signals and determines vibrational activity occurring at locations along the length of the optical sensor fiber;
providing a plurality of beacons at a respective plurality of locations along the length of the optical sensor fiber, the plurality of beacons including
  vibrators configured to generate mechanical vibrations; and
  wireless transceivers configured to transmit and receive wireless signals;
wherein the plurality of beacons generate mechanical vibrations, such vibrations are detected by the DFOS system.

2. The method of claim 1 further comprising:
providing a plurality of sensor nodes located within a wireless range of at least one of the plurality of beacons, the plurality of sensor nodes including one or more sensors configured to sense one or more environmental conditions, the plurality of sensor nodes configured to provide the sensed environmental conditions to the at least one of the plurality of beacons wirelessly.

3. The method of claim 2 wherein the at least one of the beacons communicates a broadcast synchronization message including timestamp and beaconID information to the plurality of sensor nodes wirelessly.

4. The method of claim 3 wherein the plurality of sensor nodes that receive the timestamp and beaconID information are configured to synchronize locally in response to receiving the synchronization message including the timestamp and beaconID information.

5. The method according to claim 4 wherein the plurality of sensor nodes are configured to adjust a clock delay of sensing data according to received timestamps and synchronize the plurality of sensor nodes within an entire coverage area.

6. The method according to claim 3 wherein the at least one of the beacons encodes the synchronization message including the timestamp and beaconID in a vibration code and communicates the vibration encoded synchronization message mechanically to the DFOS system.

* * * * *